(12) United States Patent
Bresney et al.

(10) Patent No.: US 8,222,526 B2
(45) Date of Patent: Jul. 17, 2012

(54) HIGH VOLTAGE BUSHING AND FLANGE WITH INTERIOR SEAL

(75) Inventors: Michael Bresney, Altamont, NY (US); Shawn M. Byrnes, Saratoga Springs, NY (US); Charles Marino, Sloansville, NY (US)

(73) Assignee: AGT Services, Amsterdam, NY (US)

( * ) Notice: Subject to any disclaimer, the term of this patent is extended or adjusted under 35 U.S.C. 154(b) by 345 days.

(21) Appl. No.: 12/509,654

(22) Filed: Jul. 27, 2009

(65) Prior Publication Data

US 2010/0018002 A1    Jan. 28, 2010

Related U.S. Application Data

(60) Provisional application No. 61/084,123, filed on Jul. 28, 2008.

(51) Int. Cl.
*H01B 17/26* (2006.01)
*F16L 5/02* (2006.01)

(52) U.S. Cl. ............... 174/152 R; 174/142; 174/137 R; 174/11 BH; 16/2.2

(58) Field of Classification Search ............ 174/137 R, 174/153 G, 152 G, 152 R, 142, 11 BH, 12 BH, 174/668, 669; 16/2.1, 2.2; 248/56; 439/604, 439/587, 274, 275, 271
See application file for complete search history.

(56) References Cited

U.S. PATENT DOCUMENTS

| | | | | |
|---|---|---|---|---|
| 3,708,612 | A * | 1/1973 | Saxon et al. | 174/142 |
| 5,483,023 | A * | 1/1996 | Barnes | 174/152 R |
| 6,460,638 | B1 * | 10/2002 | Strunsee et al. | 174/668 |
| 6,515,232 | B2 | 2/2003 | Forster | |
| 7,812,266 | B2 * | 10/2010 | Rocks et al. | 174/137 R |

FOREIGN PATENT DOCUMENTS

| | | |
|---|---|---|
| EP | 1117939 B1 | 7/2001 |
| WO | 2008054227 A1 | 5/2008 |

OTHER PUBLICATIONS

PCT, "Notification of Transmittal of the International Search Report and the Written Opinion of the International Searching Authority, or the Declaration", Dated Oct. 9, 2009, International Application No. PCT/US2009/051816.

* cited by examiner

*Primary Examiner* — Angel R Estrada
(74) *Attorney, Agent, or Firm* — Burr & Brown

(57) ABSTRACT

A high voltage bushing and flange with an interior seal. The high voltage bushing includes an outer insulating material. The high voltage bushing includes a flange with an interior seal comprised of at least two flange O-ring channels; at least two O-rings; a sealant channel; and a quantity of sealant filling the sealant channel.

20 Claims, 5 Drawing Sheets

US 8,222,526 B2

HIGH VOLTAGE BUSHING AND FLANGE WITH INTERIOR SEAL

TECHNICAL FIELD

The present invention relates generally to high voltage bushings and flanges and more particularly to a high voltage bushing and a flange with an interior seal between the flange and an outer insulating housing of the high voltage bushing.

BACKGROUND OF THE INVENTION

High voltage bushings are commonly used to carry current at a high potential through a grounded barrier.

Specifically, high voltage bushings are used to carry current from utility generators to the outside world. High voltage bushings typically comprise an inner conducting core to carry the current created within the generator to another location. The inner conducting core is typically housed by an outer insulating housing. Utility generators typically have hydrogen gas in them. The channel created by the high voltage bushing to the outside world creates a potential for leakage of the hydrogen gas to the environment external to the generator. Hydrogen gas is extremely flammable and explosive in some environments.

High voltage bushings are typically fitted with a flange that surrounds the outer insulating housing. The flange may be used to secure the high voltage bushing in place and seal the gap between two environments. The interior surface of the flange may be used to seal the gap between the internal operating environment of the generator and the environment external to the generator.

SUMMARY OF THE INVENTION

A first aspect of the invention provides a high voltage bushing comprising: an outer insulating housing; a flange with an interior seal, the interior seal comprising: at least two O-ring channels; at least two O-rings; at least one sealant channel between the at least two O-ring channels; and a quantity of sealant filling the at least one sealant channel; and a plurality of ports through a side of the flange that provides access to the at least one sealant channel.

A second aspect of the invention provides a method for forming an interior seal for a high voltage bushing, comprising: providing an outer insulating housing; providing a flange with an interior seal, the interior seal comprising: at least two O-ring channels: at least two O-rings; and at least one sealant channel between the at least two o-ring channels; and providing a plurality of ports through a side of the flange, wherein the ports open to the at least one sealant channel; injecting a sealant through each of the ports; and filling the at least one sealant channel with the sealant.

A third aspect of the invention provides a flange, comprising: at least two O-ring channels: at least one sealant channel between the at least two O-ring channels; and a plurality of ports through a side of the flange, wherein the interior portion of the port opens to the at least one sealant channel.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
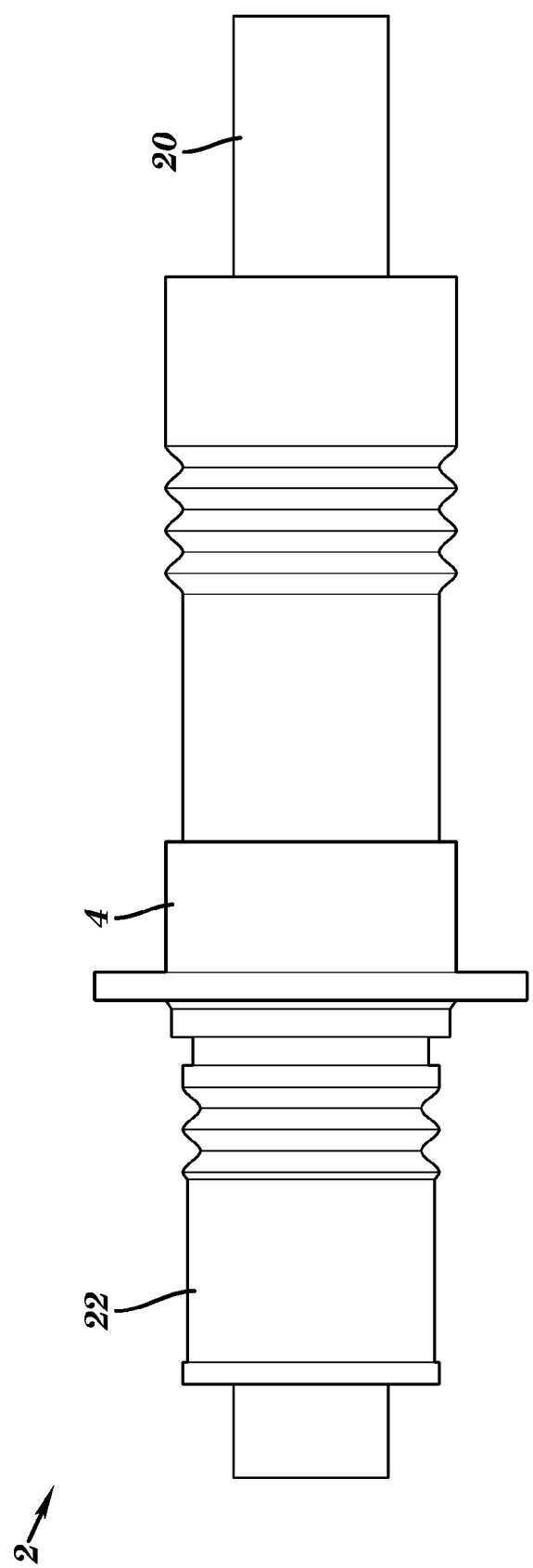
FIG. 1 shows an external view of one embodiment of a high voltage bushing with a flange.

Referring to FIG. 1, an external view of one embodiment of a high voltage bushing 2 with a flange 4 is shown. The flange 4 secures the high voltage bushing 2 to a utility generator (not shown).

Figure 2:
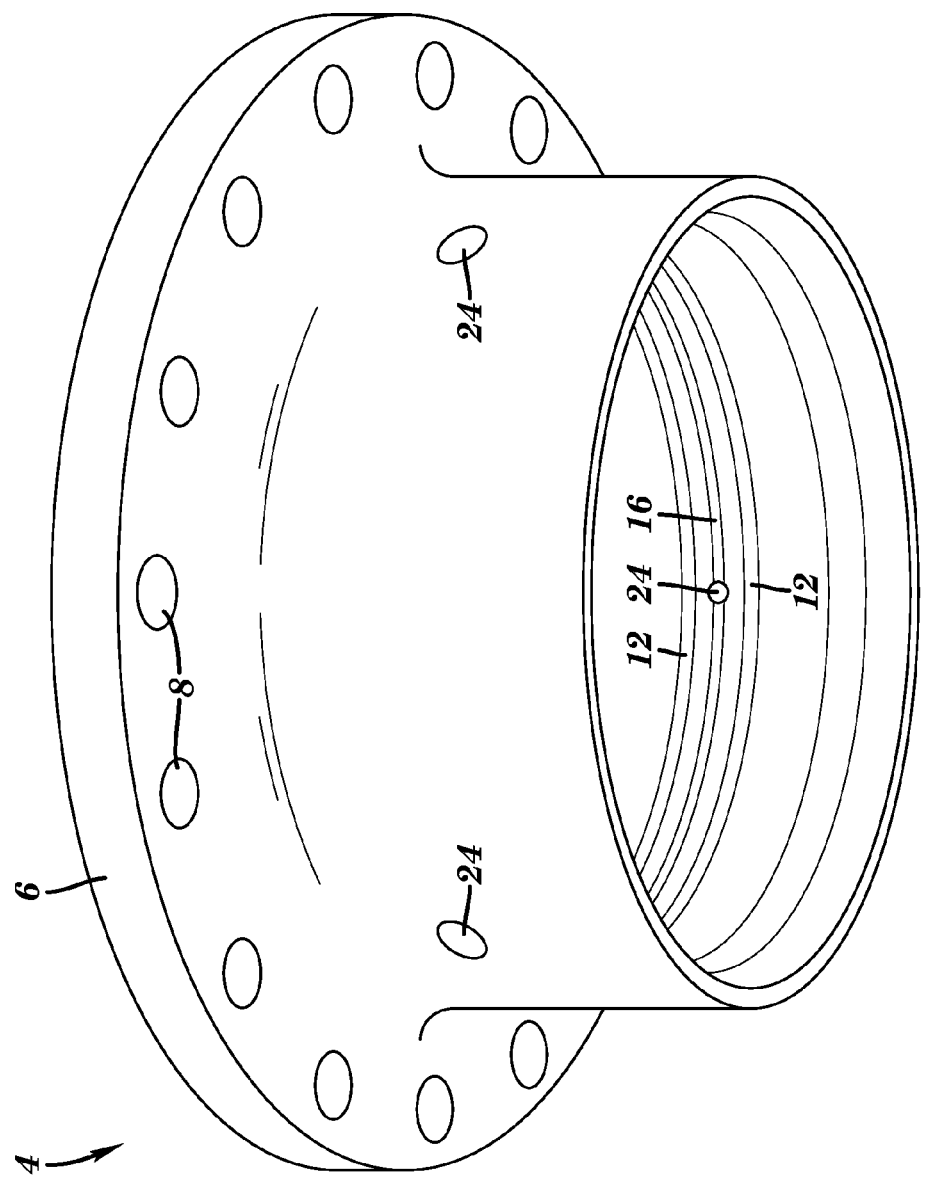
FIG. 2 shows an isometric view of one embodiment of a flange.

Referring to FIG. 2, an isometric view of one embodiment of the flange 4 is shown. The flange 4 may include a mounting plate 6 on one end of the flange 4. The mounting plate 6 may include a plurality of holes 8. The holes 8 may receive bolts (not shown) or any other suitable fastener for mounting the high voltage bushing 2 to the utility generator. A person skilled in the art will readily recognize many ways of mounting the high voltage bushing 2 to the utility generator.

Figure 3:
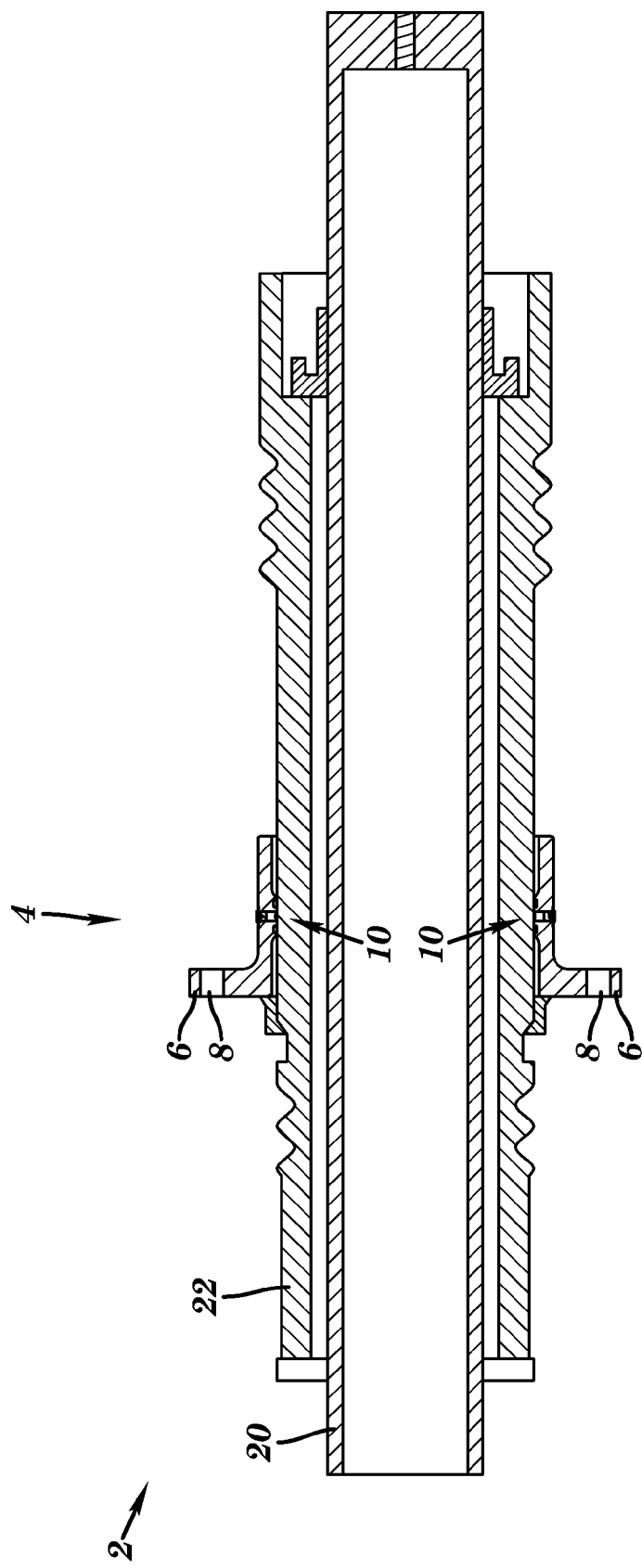
FIG. 3 shows a cross-sectional view of one embodiment of a high voltage bushing with a flange and an interior seal.
Figure 4:
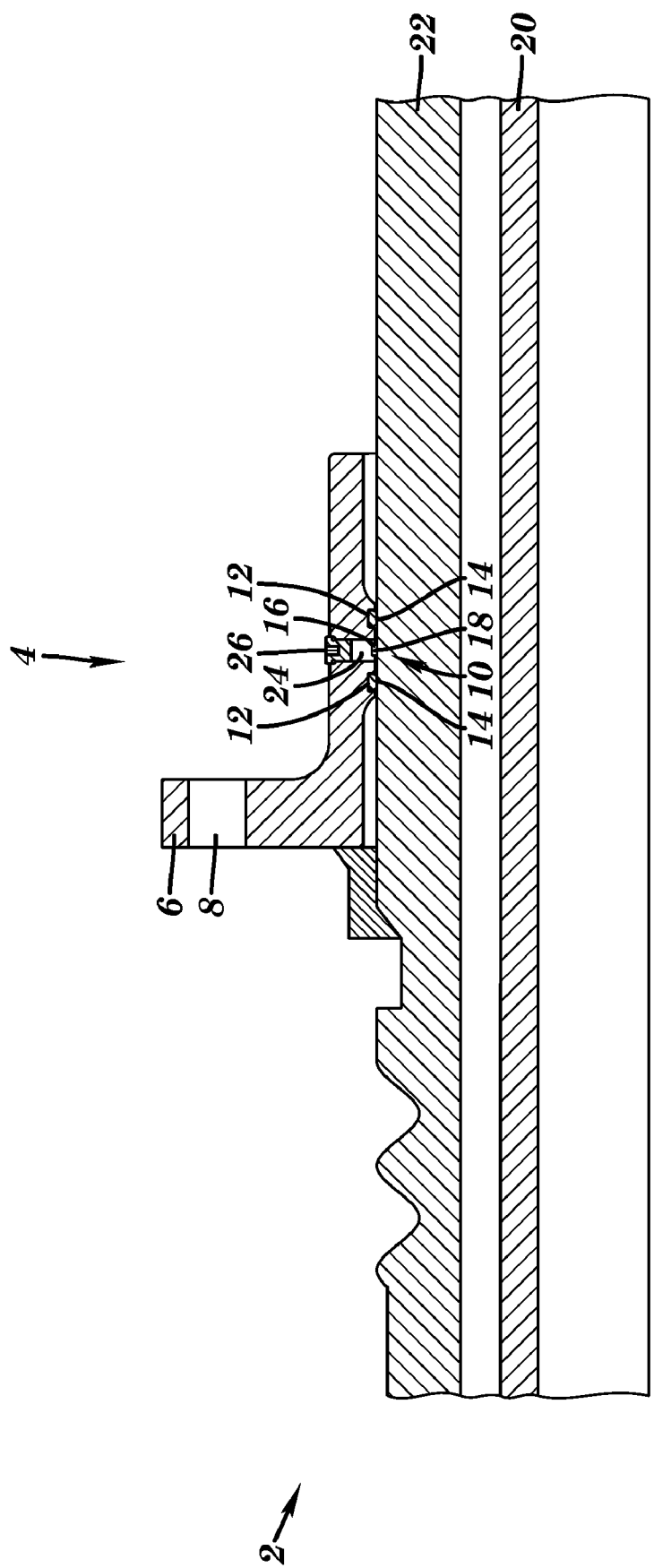
FIG. 4 shows a partial cross-sectional view of one embodiment of a high voltage bushing with a flange and an interior seal.

Referring to FIG. 3, a cross-sectional view, and FIG. 4, a partial cross-sectional view of one embodiment of a high voltage bushing 2 with a flange 4 and an interior seal 10 is shown. The interior seal 10 is comprised of at least two O-ring channels 12; at least two O-rings 14 such as those marketed as VITON® O-rings; at least one sealant channel 16 between the two O-rings 14; and a quantity of sealant 18 filling the at least one sealant channel 16. The interior seal 10 prevents leakage of hydrogen gas from the interior of the utility generator to the external environment. The high voltage bushing 2 includes an inner conducting core 20. The inner conducting core 20 may be comprised of copper, or other suitable materials known in the art. The inner conducting core 20 is housed in an outer insulating housing 22. The outer insulating housing 22 may be comprised of a glazed ceramic, or other suitable materials known in the art. In this embodiment, the outer insulating housing 22 is substantially cylindrical. The outer insulating housing 22 could be any elongated shape with a circular, oval, rectangular, or square cross-section. The flange 4 is mounted on the outer insulating housing 22. The flange 4 may be comprised of aluminum, stainless steel, or other suitable materials known in the art.

In the embodiment shown in FIG. 4, a cross section of the O-rings 14 is oval but the cross section of the O-rings 14 could be any shape such as circular or rectangular. One skilled in the art will recognize that the O-rings 14 may assume a different cross-sectional shape once in place. The cross-section of the O-ring channels 12 may be any shape that will accommodate the O-rings 14 (e.g. arcuate, rectangular, pointed). One embodiment of the invention may include the outer insulating housing 22 having an unglazed ceramic surface where each O-ring 14 contacts the outer insulating housing 22.

The at least one sealant channel 16 may be located between every two O-ring channels 12. The cross-section of the sealant channel 16 may be any shape (e.g. arcuate, rectangular, pointed). The sealant channel 16 is adapted to be filled with a sealant 18. In one embodiment, the sealant channel 16 is filled with a sealant 18 when the flange 4 is mounted with the high voltage bushing 2. Additional embodiments may include the flange 4 and interior seal 10 in use with other devices or objects that requiring mounting and sealing. The sealant 18 may be comprised of fluorosilicone channel sealant, such as Q4-2805™ produced by DOW CORNING®, or other suitable materials known in the art. One embodiment of the invention uses a sealant 18 that retains a putty-like consistency after the sealant channel 16 is filled with the sealant 18. The sealant 18 provides additional sealing capacity to the flange 4 when mounted with the high voltage bushing 2 providing further reduction in hydrogen leaking from the interior of the utility generator.

Referring again to FIG. 2, the flange 4 includes a plurality of ports 24 through a side of the flange 4. The ports 24 open to the sealant channel 16 such that the ports 24 open between the two O-ring channels 12 and provide external access to the sealant channel 16. Referring again to FIG. 4, a hydraulic fitting 26 or other suitable gas tight joint fitting may be inserted in each of the ports 24.

Figure 5:
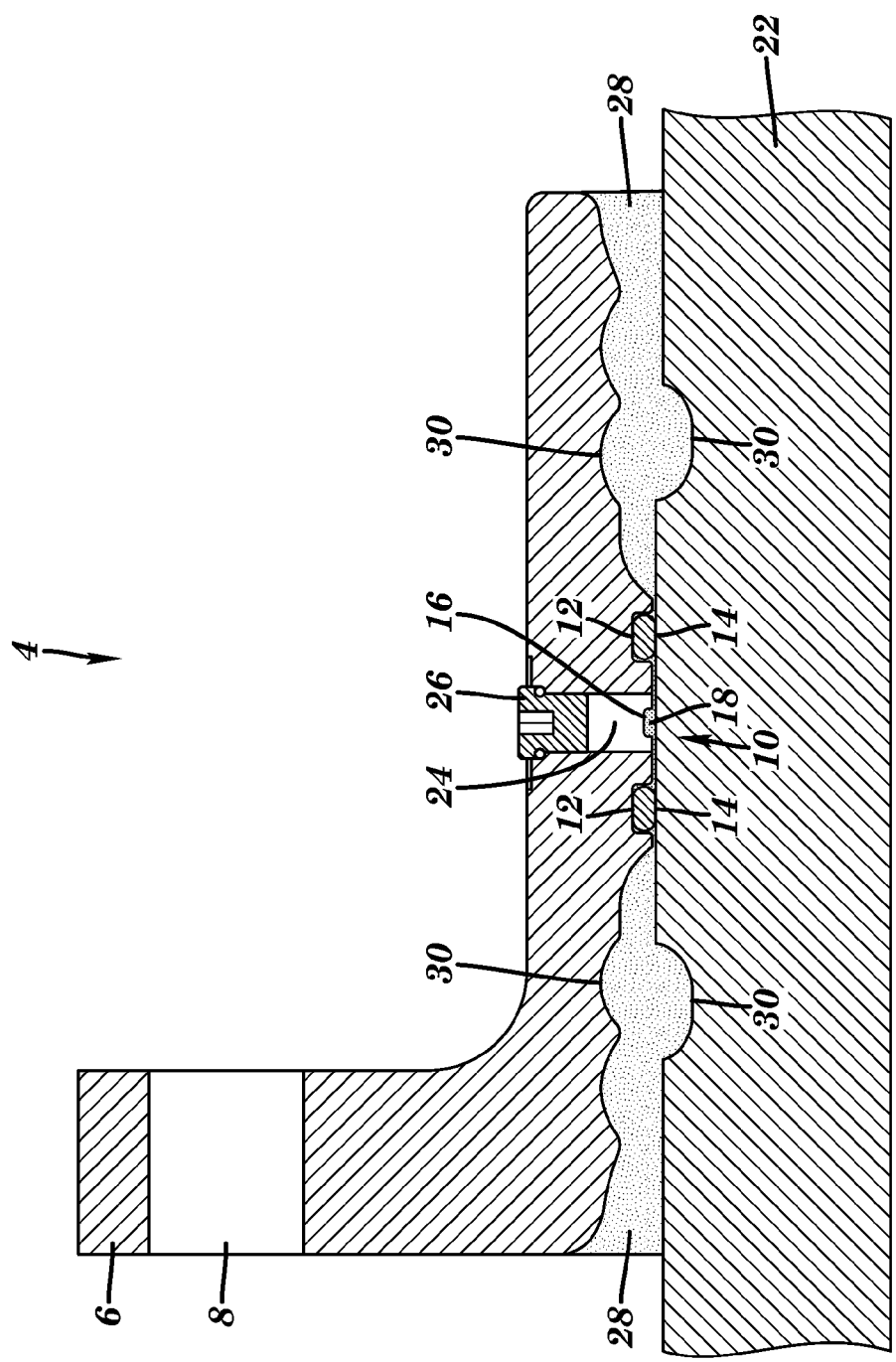
FIG. 5 shows a partial cross-sectional view of one embodiment of a high voltage bushing with a flange and an interior seal.

Referring to FIG. 5, a partial cross-sectional view of the outer insulating housing 22 with the flange 4 and interior seal 10 is shown. An epoxy 28 for additional sealing and for attaching the flange 4 to the outer insulating housing 22 may be used between the flange 4 and the outer insulating housing 22. The flange 4 and the outer insulating housing 22 may include a plurality of capture grooves 30. The capture grooves 30 may circumscribe the interior of the flange 4 and exterior of the outer insulating housing 22. The capture grooves 30 provide additional sealing and securing capacity for the epoxy 28 between the flange 4 and outer insulating housing 22. The capture grooves 30 are shown as scalloped but may be shaped for any suitable regular or irregular surface (square, pointed, etc.).

One embodiment of the invention includes a method for forming the interior seal 10 between the flange 4 and the high voltage bushing 2. The method comprises providing the high voltage bushing 2 with the outer insulating housing 22. The method further comprises providing the flange 4 with the interior seal 10. The interior seal 10 comprises at least two O-ring channels 12; at least two O-rings 14; at least one sealant channel 16 between the two O-rings 14; and the plurality of ports 24 through a side of the flange 4, wherein the ports 24 open to the sealant channel 16. The method further includes injecting the sealant 18 through the ports 24 and further includes filling the sealant channel 16 with the sealant 18.

One embodiment of the invention includes a flange 4. The flange 4 comprises: at least two O-ring channels 12: at least one sealant channel 16 between the two O-ring channels 12; and a plurality of ports 24 through a side of the flange 4, wherein the interior portion of the ports 24 open to the at least one sealant channel 16.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A high voltage bushing comprising:
   an outer insulating housing;
   a flange with an interior seal, the interior seal comprising:
      at least two flange O-ring channels;
      at least two O-rings;
      at least one sealant channel between the at least two O-ring channels; and
      a quantity of sealant filling the at least one sealant channel, the sealant retaining a fluid capacity; and
   a plurality of ports through a side of the flange that provides access to the at least one sealant channel and that retains access to the sealant channel and the sealant retaining a fluid capacity.

2. The high voltage bushing of claim 1 wherein the sealant comprises a fluorosilicone.

3. The high voltage bushing of claim 1 further comprising a hydraulic fitting inserted in each of the ports.

4. The high voltage bushing of claim 1 wherein the outer insulating housing comprises an unglazed ceramic surface where each O-ring contacts the outer insulating housing.

5. The high voltage bushing of claim 1 wherein the flange comprises one of aluminum or stainless steel.

6. The high voltage bushing of claim 1 comprising an epoxy between the flange and outer insulating housing.

7. The flange of claim 1 further comprising a mounting plate.

8. The flange of claim 7 further comprising a plurality of holes in the mounting plate.

9. A method for forming an interior seal for a high voltage bushing, comprising:
   providing an outer insulating housing;
   providing a flange with an interior seal, the interior seal comprising:
      at least two flange O-ring channels;
      at least two O-rings; and
      at least one sealant channel between the at least two o-ring channels; and
   providing a plurality of ports through a side of the flange, wherein the ports open to the at least one sealant channel;
   injecting a sealant through each of the ports; and
   filling the at least one sealant channel with the sealant, the sealant retaining a fluid capacity.

10. The method of claim 9 wherein the sealant comprises a fluorosilicone.

11. The method of claim 9 further comprising inserting a hydraulic fitting in each of the ports.

12. The method of claim 9 wherein the outer insulating housing comprises an unglazed ceramic surface where each O-ring contacts the outer insulating housing.

13. The method of claim 9 wherein the flange comprises one of aluminum or stainless steel.

14. The method of claim 9 further comprising providing an epoxy between the flange and outer insulating housing.

15. A flange, comprising:
   a mounting plate;
   at least two O-ring channels;
   at least one sealant channel between the at least two O-ring channels;
   a plurality of ports through a side of the flange, wherein the interior portion of the port opens to the at least one sealant channel; and
   a hydraulic fitting inserted in each of the ports, the hydraulic fitting configured to provide and retain access to the at least one sealant channel for injecting sealant in the at least one sealant channel.

16. The flange of claim 15 further comprising a plurality of holes in the mounting plate.

17. The flange of claim 15, wherein the flange further comprises at least one capture groove, the at least one capture groove at least partially circumscribing the interior of the flange, the at least one capture groove positioned on a side of at least one of the O-ring channels opposite the sealant channel.

18. The flange of claim 15 wherein the at least one sealant channel extends into at least one of the O-ring channels.

19. The high voltage bushing of claim 1 wherein the at least one sealant channel is in fluid communication with at least one of the O-ring channels.

20. The high voltage bushing of claim 1, wherein at least one of the flange and the outer insulating housing comprises at least one capture groove, the at least one capture groove at least partially circumscribing at least one of the interior of the flange and the exterior of the outer insulating housing, the at least one capture groove configured to receive epoxy between the flange and the outer insulating housing.

* * * * *